(12) United States Patent  (10) Patent No.: US 9,297,996 B2
Bohn et al.  (45) Date of Patent: Mar. 29, 2016

(54) LASER ILLUMINATION SCANNING

(75) Inventors: David D. Bohn, Fort Collins, CO (US); Rod G. Fleck, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 13/397,495

(22) Filed: Feb. 15, 2012

(65) Prior Publication Data

US 2013/0208362 A1 Aug. 15, 2013

(51) Int. Cl.
*G02B 27/14* (2006.01)
*G09G 5/00* (2006.01)
*G02B 26/00* (2006.01)
*G02B 27/01* (2006.01)

(52) U.S. Cl.
CPC ............. *G02B 26/00* (2013.01); *G02B 27/017* (2013.01); *G02B 2027/0178* (2013.01)

(58) Field of Classification Search
CPC ............ G02B 27/0172; G02B 27/017; G02B 26/0833; G02B 26/10; G03F 3/013
USPC ........... 359/630–634, 629, 636, 638; 345/7–9
See application file for complete search history.

(56) References Cited

U.S. PATENT DOCUMENTS

| | | | |
|---|---|---|---|
| 3,836,258 A | 9/1974 | Courten et al. | |
| 3,906,528 A | 9/1975 | Johnson | |
| 3,971,065 A | 7/1976 | Bayer | |
| 4,711,512 A | 12/1987 | Upatnieks | |
| 4,822,145 A | 4/1989 | Staelin | |
| 4,860,361 A | 8/1989 | Sato et al. | |
| 4,957,351 A | 9/1990 | Shioji | |
| 5,019,808 A | 5/1991 | Prince et al. | |
| 5,146,355 A | 9/1992 | Prince et al. | |
| 5,252,950 A | 10/1993 | Saunders et al. | |
| 5,309,169 A | 5/1994 | Leppert | |
| 5,359,444 A | 10/1994 | Piosenka et al. | |
| 5,455,458 A | 10/1995 | Quon et al. | |
| 5,455,882 A | 10/1995 | Veligdan | |

(Continued)

FOREIGN PATENT DOCUMENTS

| CN | 1440513 | 9/2003 |
|---|---|---|
| CN | 101029968 | 9/2007 |

(Continued)

OTHER PUBLICATIONS

"HDTV Helmet Mounted Display", Available at <http://defense-update.com/products/h/HDTV-HMD.htm>,(Jan. 26, 2005), 1 page.

(Continued)

*Primary Examiner* — Alicia M Harrington
(74) *Attorney, Agent, or Firm* — Micah Goldsmith; Judy Yee; Micky Minhas

(57) ABSTRACT

In embodiments of laser illumination scanning, an imaging unit includes a linear array of spatial light modulators that direct light in a direction perpendicular to an imaging scan direction. The lasers each emit the light through a diffractive optic that uniformly illuminates the spatial light modulators, and a scanning mirror then scans the spatial light modulators to generate a two-dimensional image for display. The lasers can include red, green, and blue lasers for RGB illumination of the spatial light modulators, which can be implemented as reflective liquid crystal on silicon (LCOS), transmissive LCOS, or as micro-electro-mechanical systems (MEMS) mirrors.

20 Claims, 5 Drawing Sheets

(56) References Cited

U.S. PATENT DOCUMENTS

| | | |
|---|---|---|
| 5,459,611 A | 10/1995 | Bohn et al. |
| 5,483,307 A | 1/1996 | Anderson |
| 5,543,588 A | 8/1996 | Bisset et al. |
| 5,574,473 A | 11/1996 | Sekiguchi |
| 5,579,830 A | 12/1996 | Giammaruti |
| 5,583,609 A | 12/1996 | Mizutani et al. |
| 5,606,455 A | 2/1997 | Eichenlaub |
| 5,614,941 A | 3/1997 | Hines |
| 5,648,643 A | 7/1997 | Knowles et al. |
| 5,651,414 A | 7/1997 | Suzuki et al. |
| 5,673,146 A | 9/1997 | Kelly |
| 5,708,449 A | 1/1998 | Heacock et al. |
| 5,714,967 A | 2/1998 | Okamura et al. |
| 5,737,171 A | 4/1998 | Buller et al. |
| 5,751,476 A | 5/1998 | Matsui et al. |
| 5,771,320 A | 6/1998 | Stone |
| 5,856,842 A | 1/1999 | Tedesco |
| 5,861,931 A | 1/1999 | Gillian et al. |
| 5,886,822 A | 3/1999 | Spitzer |
| 5,940,149 A | 8/1999 | Vanderwerf |
| 5,959,664 A | 9/1999 | Woodgate |
| 5,982,553 A * | 11/1999 | Bloom et al. ............... 359/627 |
| 5,991,087 A | 11/1999 | Rallison |
| 6,101,008 A | 8/2000 | Popovich |
| 6,144,439 A | 11/2000 | Carollo |
| 6,160,667 A | 12/2000 | Smoot |
| 6,188,427 B1 | 2/2001 | Anderson et al. |
| 6,226,178 B1 | 5/2001 | Broder et al. |
| 6,239,502 B1 | 5/2001 | Grewe et al. |
| 6,271,808 B1 * | 8/2001 | Corbin ........................ 345/7 |
| 6,307,142 B1 | 10/2001 | Allen et al. |
| 6,323,970 B1 | 11/2001 | Popovich |
| 6,377,401 B1 | 4/2002 | Bartlett |
| 6,411,512 B1 | 6/2002 | Mankaruse et al. |
| 6,446,442 B1 | 9/2002 | Batchelor et al. |
| 6,466,198 B1 | 10/2002 | Feinstein |
| 6,470,289 B1 | 10/2002 | Peters et al. |
| 6,481,851 B1 | 11/2002 | McNelley et al. |
| 6,496,218 B2 | 12/2002 | Takigawa et al. |
| 6,529,331 B2 | 3/2003 | Massof et al. |
| 6,542,307 B2 | 4/2003 | Gleckman et al. |
| 6,545,650 B1 | 4/2003 | Yamada et al. |
| 6,554,428 B2 | 4/2003 | Fergason et al. |
| 6,577,411 B1 | 6/2003 | David |
| 6,580,529 B1 | 6/2003 | Amitai et al. |
| 6,606,152 B2 | 8/2003 | Littau |
| 6,621,702 B2 | 9/2003 | Elias et al. |
| 6,631,755 B1 | 10/2003 | Kung et al. |
| 6,635,999 B2 | 10/2003 | Belliveau |
| 6,639,201 B2 | 10/2003 | Almogy et al. |
| 6,735,499 B2 | 5/2004 | Ohki et al. |
| 6,753,828 B2 | 6/2004 | Tuceryan et al. |
| 6,775,460 B2 | 8/2004 | Steiner et al. |
| 6,804,115 B2 | 10/2004 | Lai |
| 6,809,925 B2 | 10/2004 | Belady et al. |
| 6,825,987 B2 | 11/2004 | Repetto et al. |
| 6,829,095 B2 | 12/2004 | Amitai |
| 6,867,753 B2 | 3/2005 | Chinthammit et al. |
| 6,888,613 B2 | 5/2005 | Robins et al. |
| 6,889,755 B2 | 5/2005 | Zuo et al. |
| 6,906,901 B1 | 6/2005 | Liu |
| 6,919,867 B2 | 7/2005 | Sauer |
| 6,947,020 B2 | 9/2005 | Kiser et al. |
| 6,964,731 B1 | 11/2005 | Krisko et al. |
| 6,971,443 B2 | 12/2005 | Kung et al. |
| 6,992,738 B2 | 1/2006 | Ishihara et al. |
| 6,997,241 B2 | 2/2006 | Chou et al. |
| 7,006,215 B2 | 2/2006 | Hoff et al. |
| 7,015,876 B1 | 3/2006 | Miller |
| 7,048,385 B2 | 5/2006 | Beeson et al. |
| 7,069,975 B1 | 7/2006 | Haws et al. |
| 7,113,605 B2 | 9/2006 | Rui et al. |
| 7,116,555 B2 | 10/2006 | Kamath et al. |
| 7,184,615 B2 | 2/2007 | Levola |
| 7,191,820 B2 | 3/2007 | Chou et al. |
| 7,193,584 B2 | 3/2007 | Lee et al. |
| 7,250,930 B2 | 7/2007 | Hoffman et al. |
| 7,261,453 B2 | 8/2007 | Morejon et al. |
| 7,271,795 B2 | 9/2007 | Bradski |
| 7,277,282 B2 | 10/2007 | Tate |
| 7,301,587 B2 | 11/2007 | Uehara et al. |
| 7,337,018 B2 | 2/2008 | Espinoza-Ibarra et al. |
| 7,359,420 B2 | 4/2008 | Shchegrov et al. |
| 7,365,734 B2 | 4/2008 | Fateh et al. |
| 7,369,101 B2 | 5/2008 | Sauer et al. |
| 7,376,852 B2 | 5/2008 | Edwards |
| 7,396,133 B2 | 7/2008 | Burnett et al. |
| 7,412,306 B2 | 8/2008 | Katoh et al. |
| 7,416,017 B2 | 8/2008 | Haws et al. |
| 7,417,617 B2 | 8/2008 | Eichenlaub |
| 7,428,001 B2 | 9/2008 | Schowengerdt et al. |
| 7,430,349 B2 | 9/2008 | Jones |
| 7,430,355 B2 | 9/2008 | Heikenfeld et al. |
| 7,455,102 B2 | 11/2008 | Cheng |
| 7,505,269 B1 | 3/2009 | Cosley et al. |
| 7,513,627 B2 | 4/2009 | Larson et al. |
| 7,515,143 B2 | 4/2009 | Keam et al. |
| 7,542,665 B2 | 6/2009 | Lei |
| 7,551,814 B1 | 6/2009 | Smits |
| 7,576,916 B2 | 8/2009 | Amitai |
| 7,583,327 B2 | 9/2009 | Takatani |
| 7,607,111 B2 | 10/2009 | Vaananen et al. |
| 7,619,895 B1 | 11/2009 | Wertz et al. |
| 7,631,687 B2 | 12/2009 | Yang |
| 7,646,606 B2 | 1/2010 | Rytka et al. |
| 7,660,500 B2 | 2/2010 | Konttinen et al. |
| 7,679,641 B2 | 3/2010 | Lipton et al. |
| 7,693,292 B1 | 4/2010 | Gross et al. |
| 7,701,716 B2 | 4/2010 | Blanco, Jr. et al. |
| 7,719,769 B2 | 5/2010 | Sugihara et al. |
| 7,768,534 B2 | 8/2010 | Pentenrieder et al. |
| 7,777,944 B2 | 8/2010 | Ho et al. |
| 7,817,104 B2 | 10/2010 | Ryu et al. |
| 7,843,691 B2 | 11/2010 | Reichert et al. |
| 7,894,613 B1 | 2/2011 | Ong et al. |
| 7,903,409 B2 | 3/2011 | Patel et al. |
| 7,909,958 B2 | 3/2011 | Washburn et al. |
| 7,941,231 B1 | 5/2011 | Dunn |
| 7,986,462 B2 | 7/2011 | Kobayashi et al. |
| 8,004,621 B2 | 8/2011 | Woodgate et al. |
| 8,033,709 B2 | 10/2011 | Kao et al. |
| 8,046,616 B2 | 10/2011 | Edwards |
| 8,061,411 B2 | 11/2011 | Xu et al. |
| 8,085,948 B2 | 12/2011 | Thomas et al. |
| 8,125,579 B2 | 2/2012 | Khan et al. |
| 8,160,411 B2 | 4/2012 | Levola et al. |
| 8,195,220 B2 | 6/2012 | Kim et al. |
| 8,233,204 B1 | 7/2012 | Robbins et al. |
| 8,233,273 B2 | 7/2012 | Chen et al. |
| 8,246,170 B2 | 8/2012 | Yamamoto et al. |
| 8,274,614 B2 | 9/2012 | Yokote et al. |
| 8,384,999 B1 | 2/2013 | Crosby et al. |
| 8,392,035 B2 | 3/2013 | Patel et al. |
| 8,395,898 B1 | 3/2013 | Chamseddine et al. |
| 8,418,083 B1 | 4/2013 | Lundy et al. |
| 8,446,340 B2 | 5/2013 | Aharoni |
| 8,472,119 B1 | 6/2013 | Kelly |
| 8,482,920 B2 | 7/2013 | Tissot et al. |
| 8,576,143 B1 | 11/2013 | Kelly |
| 8,611,014 B2 | 12/2013 | Valera et al. |
| 8,629,815 B2 | 1/2014 | Brin et al. |
| 8,638,498 B2 | 1/2014 | Bohn |
| 8,645,871 B2 | 2/2014 | Fong et al. |
| 8,666,212 B1 | 3/2014 | Amirparviz |
| 8,712,598 B2 | 4/2014 | Dighde et al. |
| 8,754,831 B2 | 6/2014 | Kollin et al. |
| 8,770,813 B2 | 7/2014 | Bohn et al. |
| 8,810,600 B2 | 8/2014 | Bohn et al. |
| 8,817,350 B1 | 8/2014 | Robbins et al. |
| 8,823,531 B1 | 9/2014 | McCleary et al. |
| 8,854,802 B2 | 10/2014 | Robinson et al. |
| 8,909,384 B1 | 12/2014 | Beitelmal et al. |
| 8,917,453 B2 | 12/2014 | Bohn |
| 8,934,235 B2 | 1/2015 | Rubenstein et al. |

(56) References Cited

U.S. PATENT DOCUMENTS

| | | |
|---|---|---|
| 8,941,683 B2 | 1/2015 | Son et al. |
| 8,989,535 B2 | 3/2015 | Robbins |
| 9,052,414 B2 | 6/2015 | Travis et al. |
| 9,223,138 B2 | 12/2015 | Bohn |
| 2001/0043208 A1* | 11/2001 | Furness et al. ............... 345/207 |
| 2002/0041735 A1 | 4/2002 | Cai et al. |
| 2002/0044152 A1 | 4/2002 | Abbott et al. |
| 2002/0044162 A1 | 4/2002 | Sawatari |
| 2002/0063820 A1 | 5/2002 | Broer et al. |
| 2002/0097558 A1 | 7/2002 | Stone et al. |
| 2002/0171939 A1 | 11/2002 | Song |
| 2002/0180659 A1 | 12/2002 | Takahashi |
| 2003/0006364 A1 | 1/2003 | Katzir et al. |
| 2003/0023889 A1 | 1/2003 | Hofstee et al. |
| 2003/0137706 A1 | 7/2003 | Rmanujam et al. |
| 2003/0179453 A1 | 9/2003 | Mori et al. |
| 2004/0011503 A1 | 1/2004 | Kung et al. |
| 2004/0085649 A1 | 5/2004 | Repetto et al. |
| 2004/0108971 A1 | 6/2004 | Waldern et al. |
| 2004/0109234 A1 | 6/2004 | Levola |
| 2004/0135209 A1 | 7/2004 | Hsieh et al. |
| 2004/0195963 A1 | 10/2004 | Choi et al. |
| 2004/0267990 A1 | 12/2004 | Lin |
| 2005/0174737 A1 | 8/2005 | Meir |
| 2005/0207120 A1 | 9/2005 | Tseng et al. |
| 2005/0225233 A1 | 10/2005 | Boroson et al. |
| 2005/0243107 A1 | 11/2005 | Haim et al. |
| 2005/0248705 A1 | 11/2005 | Smith et al. |
| 2005/0285878 A1 | 12/2005 | Singh et al. |
| 2006/0018025 A1* | 1/2006 | Sharon et al. ............... 359/618 |
| 2006/0032616 A1 | 2/2006 | Yang |
| 2006/0038881 A1 | 2/2006 | Starkweather et al. |
| 2006/0044399 A1 | 3/2006 | Fredlund et al. |
| 2006/0054787 A1 | 3/2006 | Olsen et al. |
| 2006/0072206 A1 | 4/2006 | Tsuyuki et al. |
| 2006/0118280 A1 | 6/2006 | Liu |
| 2006/0129951 A1 | 6/2006 | Vaananen et al. |
| 2006/0132914 A1 | 6/2006 | Weiss et al. |
| 2006/0139447 A1 | 6/2006 | Unkrich |
| 2006/0152646 A1 | 7/2006 | Schrader |
| 2006/0164382 A1 | 7/2006 | Kulas et al. |
| 2006/0196643 A1 | 9/2006 | Hata et al. |
| 2006/0221448 A1 | 10/2006 | Nivon et al. |
| 2006/0228073 A1 | 10/2006 | Mukawa et al. |
| 2006/0249765 A1 | 11/2006 | Hsieh |
| 2007/0002412 A1 | 1/2007 | Aihara |
| 2007/0008456 A1 | 1/2007 | Lesage et al. |
| 2007/0023703 A1 | 2/2007 | Sunaoshi et al. |
| 2007/0027591 A1 | 2/2007 | Goldenberg et al. |
| 2007/0041684 A1 | 2/2007 | Popovich |
| 2007/0097019 A1 | 5/2007 | Wynne-Powell et al. |
| 2007/0147673 A1 | 6/2007 | Crandall |
| 2007/0153395 A1 | 7/2007 | Repetto et al. |
| 2007/0177260 A1 | 8/2007 | Kuppenheimer et al. |
| 2007/0236959 A1 | 10/2007 | Tolbert |
| 2007/0284093 A1 | 12/2007 | Bhatti et al. |
| 2008/0043100 A1 | 2/2008 | Sobel et al. |
| 2008/0043425 A1 | 2/2008 | Hebert et al. |
| 2008/0088603 A1 | 4/2008 | Eliasson et al. |
| 2008/0088624 A1 | 4/2008 | Long et al. |
| 2008/0106677 A1 | 5/2008 | Kuan et al. |
| 2008/0117341 A1 | 5/2008 | McGrew |
| 2008/0141681 A1 | 6/2008 | Arnold |
| 2008/0150913 A1 | 6/2008 | Bell et al. |
| 2008/0174735 A1 | 7/2008 | Quach et al. |
| 2008/0232680 A1 | 9/2008 | Berestov et al. |
| 2008/0248852 A1 | 10/2008 | Rasmussen |
| 2008/0285140 A1 | 11/2008 | Amitai |
| 2008/0297535 A1 | 12/2008 | Reinig |
| 2008/0303918 A1 | 12/2008 | Keithley |
| 2008/0311386 A1 | 12/2008 | Wendt |
| 2009/0002939 A1 | 1/2009 | Baugh et al. |
| 2009/0015742 A1 | 1/2009 | Liao et al. |
| 2009/0021908 A1 | 1/2009 | Patel et al. |
| 2009/0051283 A1 | 2/2009 | Cok et al. |
| 2009/0084525 A1 | 4/2009 | Satou et al. |
| 2009/0092261 A1 | 4/2009 | Bard |
| 2009/0097127 A1 | 4/2009 | Amitai |
| 2009/0128449 A1 | 5/2009 | Brown et al. |
| 2009/0128901 A1 | 5/2009 | Tilleman et al. |
| 2009/0180250 A1 | 7/2009 | Holling et al. |
| 2009/0189974 A1 | 7/2009 | Deering |
| 2009/0190003 A1 | 7/2009 | Park et al. |
| 2009/0195756 A1 | 8/2009 | Li et al. |
| 2009/0222147 A1 | 9/2009 | Nakashima et al. |
| 2009/0244413 A1 | 10/2009 | Ishikawa et al. |
| 2009/0246707 A1 | 10/2009 | Li et al. |
| 2009/0256837 A1 | 10/2009 | Deb et al. |
| 2009/0262419 A1 | 10/2009 | Robinson et al. |
| 2010/0002989 A1 | 1/2010 | Tokushima |
| 2010/0021108 A1 | 1/2010 | Kang et al. |
| 2010/0053151 A1 | 3/2010 | Marti et al. |
| 2010/0060551 A1* | 3/2010 | Sugiyama et al. ............... 345/8 |
| 2010/0061078 A1 | 3/2010 | Kim et al. |
| 2010/0084674 A1 | 4/2010 | Paetzold et al. |
| 2010/0096617 A1 | 4/2010 | Shanks |
| 2010/0103078 A1 | 4/2010 | Mukawa et al. |
| 2010/0134534 A1 | 6/2010 | Sesselberg et al. |
| 2010/0141905 A1 | 6/2010 | Burke |
| 2010/0149073 A1 | 6/2010 | Chaum et al. |
| 2010/0188353 A1 | 7/2010 | Yoon et al. |
| 2010/0200736 A1 | 8/2010 | Laycock et al. |
| 2010/0201953 A1 | 8/2010 | Freeman et al. |
| 2010/0213467 A1 | 8/2010 | Lee et al. |
| 2010/0220439 A1 | 9/2010 | Qin |
| 2010/0229853 A1 | 9/2010 | Vandal et al. |
| 2010/0238270 A1 | 9/2010 | Bjelkhagen et al. |
| 2010/0238664 A1 | 9/2010 | Theodorus et al. |
| 2010/0245387 A1 | 9/2010 | Bachelder et al. |
| 2010/0259889 A1 | 10/2010 | Chen et al. |
| 2010/0271467 A1 | 10/2010 | Akeley |
| 2010/0277421 A1 | 11/2010 | Charlier et al. |
| 2010/0277439 A1 | 11/2010 | Charlier et al. |
| 2010/0277779 A1 | 11/2010 | Futterer et al. |
| 2010/0281439 A1 | 11/2010 | Markovic et al. |
| 2010/0300654 A1 | 12/2010 | Edwards |
| 2010/0309687 A1 | 12/2010 | Sampsell et al. |
| 2010/0315781 A1 | 12/2010 | Agostini |
| 2010/0317132 A1 | 12/2010 | Rogers et al. |
| 2010/0321609 A1 | 12/2010 | Qi et al. |
| 2010/0328351 A1 | 12/2010 | Tan |
| 2011/0012814 A1 | 1/2011 | Tanaka |
| 2011/0021251 A1 | 1/2011 | Lindén |
| 2011/0025605 A1 | 2/2011 | Kwitek |
| 2011/0032482 A1 | 2/2011 | Agurok |
| 2011/0050547 A1 | 3/2011 | Mukawa |
| 2011/0050655 A1 | 3/2011 | Mukawa |
| 2011/0063795 A1 | 3/2011 | Yeh et al. |
| 2011/0075442 A1 | 3/2011 | Chiang |
| 2011/0084893 A1 | 4/2011 | Lee et al. |
| 2011/0090343 A1 | 4/2011 | Alt et al. |
| 2011/0091156 A1 | 4/2011 | Laughlin |
| 2011/0114823 A1 | 5/2011 | Katzir et al. |
| 2011/0127024 A1 | 6/2011 | Patel et al. |
| 2011/0134017 A1 | 6/2011 | Burke |
| 2011/0134645 A1 | 6/2011 | Hitchcock et al. |
| 2011/0141388 A1 | 6/2011 | Park et al. |
| 2011/0148931 A1 | 6/2011 | Kim |
| 2011/0163986 A1 | 7/2011 | Lee et al. |
| 2011/0194029 A1 | 8/2011 | Herrmann et al. |
| 2011/0205251 A1 | 8/2011 | Auld |
| 2011/0210946 A1 | 9/2011 | Goertz et al. |
| 2011/0214082 A1 | 9/2011 | Osterhout et al. |
| 2011/0215349 A1 | 9/2011 | An et al. |
| 2011/0221658 A1 | 9/2011 | Haddick et al. |
| 2011/0221659 A1 | 9/2011 | King et al. |
| 2011/0222236 A1 | 9/2011 | Luo et al. |
| 2011/0227820 A1 | 9/2011 | Haddick et al. |
| 2011/0227913 A1 | 9/2011 | Hyndman |
| 2011/0242145 A1 | 10/2011 | Nishimura et al. |
| 2011/0242392 A1 | 10/2011 | Chiang |
| 2011/0242757 A1 | 10/2011 | Tracy et al. |
| 2011/0248904 A1 | 10/2011 | Miyawaki et al. |
| 2011/0248958 A1 | 10/2011 | Gruhlke et al. |

(56) References Cited

U.S. PATENT DOCUMENTS

| | | |
|---|---|---|
| 2011/0267799 A1 | 11/2011 | Epstein et al. |
| 2011/0283223 A1 | 11/2011 | Vaittinen et al. |
| 2011/0299044 A1 | 12/2011 | Yeh et al. |
| 2011/0304640 A1 | 12/2011 | Noge |
| 2011/0309378 A1 | 12/2011 | Lau et al. |
| 2011/0310232 A1 | 12/2011 | Wilson et al. |
| 2011/0310312 A1 | 12/2011 | Yokote et al. |
| 2012/0013651 A1 | 1/2012 | Trayner et al. |
| 2012/0019434 A1 | 1/2012 | Kuhlman et al. |
| 2012/0026161 A1 | 2/2012 | Chen et al. |
| 2012/0033306 A1 | 2/2012 | Valera et al. |
| 2012/0038629 A1 | 2/2012 | Brown et al. |
| 2012/0041721 A1 | 2/2012 | Chen |
| 2012/0050144 A1 | 3/2012 | Morlock et al. |
| 2012/0052934 A1 | 3/2012 | Maharbiz et al. |
| 2012/0062998 A1 | 3/2012 | Schultz et al. |
| 2012/0069413 A1 | 3/2012 | Schultz |
| 2012/0102438 A1 | 4/2012 | Robinson et al. |
| 2012/0106170 A1 | 5/2012 | Matthews et al. |
| 2012/0111544 A1 | 5/2012 | Senatori |
| 2012/0113092 A1 | 5/2012 | Bar-Zeev et al. |
| 2012/0157114 A1 | 6/2012 | Alameh et al. |
| 2012/0162764 A1 | 6/2012 | Shimizu |
| 2012/0176474 A1 | 7/2012 | Border |
| 2012/0182687 A1 | 7/2012 | Dighde et al. |
| 2012/0188205 A1 | 7/2012 | Jansson et al. |
| 2012/0200495 A1 | 8/2012 | Johansson |
| 2012/0206589 A1 | 8/2012 | Crandall |
| 2012/0206880 A1 | 8/2012 | Andres et al. |
| 2012/0218301 A1 | 8/2012 | Miller |
| 2012/0227006 A1 | 9/2012 | Amm |
| 2012/0235885 A1 | 9/2012 | Miller et al. |
| 2012/0242561 A1 | 9/2012 | Sugihara |
| 2012/0242798 A1 | 9/2012 | Mcardle et al. |
| 2012/0256856 A1 | 10/2012 | Suzuki et al. |
| 2012/0256963 A1 | 10/2012 | Suzuki et al. |
| 2012/0287381 A1 | 11/2012 | Li et al. |
| 2013/0000871 A1 | 1/2013 | Olson et al. |
| 2013/0027772 A1 | 1/2013 | Large |
| 2013/0033485 A1 | 2/2013 | Kollin et al. |
| 2013/0081779 A1 | 4/2013 | Liao et al. |
| 2013/0093741 A1 | 4/2013 | Akimoto et al. |
| 2013/0106674 A1 | 5/2013 | Wheeler et al. |
| 2013/0162673 A1 | 6/2013 | Bohn |
| 2013/0163089 A1 | 6/2013 | Bohn |
| 2013/0170031 A1 | 7/2013 | Bohn |
| 2013/0186596 A1 | 7/2013 | Rubenstein |
| 2013/0186598 A1 | 7/2013 | Rubenstein |
| 2013/0187943 A1 | 7/2013 | Bohn et al. |
| 2013/0207964 A1 | 8/2013 | Fleck |
| 2013/0208003 A1 | 8/2013 | Bohn |
| 2013/0208482 A1 | 8/2013 | Fleck |
| 2013/0215081 A1 | 8/2013 | Levin et al. |
| 2013/0242056 A1 | 9/2013 | Fleck |
| 2013/0252628 A1 | 9/2013 | Kuehnel |
| 2013/0257848 A1 | 10/2013 | Westerinen et al. |
| 2013/0258701 A1 | 10/2013 | Westerinen et al. |
| 2013/0267309 A1 | 10/2013 | Robbins |
| 2013/0294030 A1 | 11/2013 | Wang et al. |
| 2013/0307875 A1 | 11/2013 | Anderson |
| 2013/0314793 A1 | 11/2013 | Robbins |
| 2013/0322810 A1 | 12/2013 | Robbins |
| 2013/0332159 A1 | 12/2013 | Federighi et al. |
| 2013/0335671 A1 | 12/2013 | Fleck |
| 2013/0342674 A1 | 12/2013 | Dixon |
| 2014/0010265 A1 | 1/2014 | Peng |
| 2014/0041827 A1 | 2/2014 | Giaimo |
| 2014/0078130 A1 | 3/2014 | Uchino et al. |
| 2014/0094973 A1 | 4/2014 | Giaimo et al. |
| 2014/0104665 A1 | 4/2014 | Popovich et al. |
| 2014/0104685 A1 | 4/2014 | Bohn |
| 2014/0111865 A1 | 4/2014 | Kobayashi |
| 2014/0140653 A1 | 5/2014 | Brown et al. |
| 2014/0140654 A1 | 5/2014 | Brown et al. |
| 2014/0176528 A1 | 6/2014 | Robbins |
| 2014/0184699 A1 | 7/2014 | Ito et al. |
| 2014/0204455 A1 | 7/2014 | Popovich |
| 2014/0240842 A1 | 8/2014 | Nguyen et al. |

FOREIGN PATENT DOCUMENTS

| | | |
|---|---|---|
| CN | 102004315 | 4/2011 |
| EP | 0977022 | 2/2000 |
| EP | 1494109 | 1/2005 |
| EP | 2112547 | 10/2009 |
| EP | 2216678 | 1/2010 |
| JP | H0422358 | 1/1992 |
| JP | 7311303 | 11/1995 |
| JP | 2001078234 | 3/2001 |
| JP | 2008017135 | 1/2008 |
| KR | 20090076539 | 7/2009 |
| KR | 20110070087 | 6/2011 |
| KR | 20120023458 | 3/2012 |
| WO | WO-9418595 | 8/1994 |
| WO | WO-0133282 | 5/2001 |
| WO | WO-0195027 | 12/2001 |
| WO | WO-03090611 | 11/2003 |
| WO | WO-2006054056 | 5/2006 |
| WO | WO-2008021504 | 2/2008 |
| WO | WO-2009077601 | 6/2009 |
| WO | WO-2010125337 | 11/2010 |
| WO | WO-2011003381 | 1/2011 |
| WO | WO-2011051660 | 5/2011 |
| WO | WO-2011090455 | 7/2011 |
| WO | 2011110728 | 9/2011 |
| WO | WO-2011110728 | 9/2011 |
| WO | WO-2011131978 | 10/2011 |
| WO | WO-2012172295 | 12/2012 |
| WO | WO-2014130383 | 8/2014 |

OTHER PUBLICATIONS

Baluja, Shumeet et al., "Non-Intrusive Gaze Tracking Using Artificial Neural Networks", *Technical Report CMU-CS*-94-102, Available at <http://citeseerx.ist.psu.edu/viewdoc/download?doi=10.1.1.33.4027&rep=rep1&type=pdf>,(Jan. 5, 1994), 14 pages.

Cheng, Yu-Hsiang et al., "Waveguide Displays Based on Polymer-dispersed Liquid Crystals", *SPIE Newsroom*, Available at http://spie.org/documents/Newsroom/Imported/003805/003805_10.pdf>,(Aug. 12, 2011), 2 pages.

Karp, Jason H., et al., "Planar Micro-optic Solar Concentration using Multiple Imaging Lenses onto a Common Slab Waveguide", *In Proceedings of SPIE vol.* 7407, Available at <http://psilab.ucsd.edu/research/slab_concentration/files/SPIE_Slab_Published.pdf>,(Jan. 2009), 11 pages.

Singh Brar, Rajwinder et al., "Laser-Based Head-Tracked 3D Display Research", *Journal of Display Technology*, vol. 6, No. 10, Available at <http://ieeexplore.ieee.org/stamp/stamp.jsp?tp=&arnumber=5462999>,(Oct. 2010), pp. 531-543.

Allen, et al., "ELiXIR—Solid-State Luminaire with Enhanced Light Extraction by Internal Reflection", Retrieved at <<http://www.nanolab.uc.edu/Publications/PDFfiles/355.pdf>>, Proceedings of Journal of Display Technology, Jun. 2007, pp. 155-159.

"Non-Final Office Action", U.S. Appl. No. 13/343,675, (Jul. 16, 2013), 9 pages.

"PCT Search Report and Written Opinion", Application No. PCT/US2013/026200, (Jun. 3, 2013), 9 pages.

"Non-Final Office Action", U.S. Appl. No. 13/397,516, Nov. 25, 2013, 10 pages.

"Notice of Allowance", U.S. Appl. No. 13/343,675, Sep. 16, 2013, 8 pages.

"Non-Final Office Action", U.S. Appl. No. 13/336,895, Oct. 24, 2013, 9 pages.

"Final Office Action", U.S. Appl. No. 14/134,993, Aug. 20, 2014, 15 pages.

"Foreign Office Action", CN Application No. 201210567932.5, Aug. 14, 2014, 12 pages.

"Non-Final Office Action", U.S. Appl. No. 13/336,873, Jul. 25, 2014, 16 pages.

(56) References Cited

OTHER PUBLICATIONS

"Non-Final Office Action", U.S. Appl. No. 13/397,617, Oct. 9, 2014, 6 pages.
"Notice of Allowance", U.S. Appl. No. 13/336,895, Aug. 11, 2014, 6 pages.
"Supplemental Notice of Allowance", U.S. Appl. No. 13/356,545, Jul. 22, 2014, 2 pages.
"Final Office Action", U.S. Appl. No. 13/336,895, May 27, 2014, 11 pages.
"Non-Final Office Action", U.S. Appl. No. 13/397,516, Jun. 12, 2014, 11 pages.
"Non-Final Office Action", U.S. Appl. No. 14/134,993, Apr. 17, 2014, 34 pages.
"Notice of Allowance", U.S. Appl. No. 13/356,545, Mar. 28, 2014, 6 pages.
"Advisory Action", U.S. Appl. No. 13/428,879, Sep. 19, 2014, 3 pages.
"Augmented Reality and Physical Games", U.S. Appl. No. 13/440,165, Apr. 5, 2012, 49 pages.
"BragGrate Mirror", Retrieved from <http://web.archive.org/web/20090814104232/http://www.optigrate.com/BragGrate_Mirror.html> on Jul. 8, 2014, Aug. 14, 2009, 2 pages.
"Corrected Final Office Action", U.S. Appl. No. 13/432,311, Dec. 24, 2014, 25 pages.
"Corrected Notice of Allowance", U.S. Appl. No. 13/355,836, Sep. 11, 2014, 2 pages.
"Corrected Notice of Allowance", U.S. Appl. No. 13/355,836, Dec. 15, 2014, 2 pages.
"DigiLens", SBG Labs, retrieved from <http://www.digilens.com/products.html> on Jun. 19, 2012, 1 page.
"Final Office Action", U.S. Appl. No. 13/355,836, Mar. 10, 2014, 18 pages.
"Final Office Action", U.S. Appl. No. 13/355,914, Feb. 23, 2015, 21 pages.
"Final Office Action", U.S. Appl. No. 13/355,914, Jun. 19, 2014, 11 pages.
"Final Office Action", U.S. Appl. No. 13/397,516, Jan. 29, 2015, 13 pages.
"Final Office Action", U.S. Appl. No. 13/428,879, Jul. 14, 2014, 12 pages.
"Final Office Action", U.S. Appl. No. 13/432,311, Dec. 15, 2014, 24 pages.
"Final Office Action", U.S. Appl. No. 13/432,372, Jan. 29, 2015, 33 pages.
"Final Office Action", U.S. Appl. No. 13/440,165, Jun. 6, 2014, 12 pages.
"Final Office Action", U.S. Appl. No. 13/477,646, Feb. 23, 2015, 36 pages.
"Final Office Action", U.S. Appl. No. 13/477,646, May 5, 2014, 26 pages.
"Foreign Notice of Allowance", CN Application No. 201320034345.X, Aug. 14, 2013, 2 Pages.
"Foreign Office Action", CN Application No. 201210563730.3, Jan. 7, 2015, 16 pages.
"International Search Report and Written Opinion", Application No. PCT/US2014/016658, 10 pages.
"International Search Report and Written Opinion", Application No. PCT/US2013/053676, Oct. 16, 2013, 10 pages.
"International Search Report and Written Opinion", Application No. PCT/US2013/030632, Jun. 26, 2013, 10 pages.
"International Search Report and Written Opinion", Application No. PCT/US2013/028477, Jun. 21, 2013, 11 pages.
"International Search Report and Written Opinion", Application No. PCT/US2013/031111, Jun. 26, 2013, 11 pages.
"International Search Report and Written Opinion", Application No. PCT/US2013/076832, Mar. 17, 2014, 12 pages.
"International Search Report and Written Opinion", Application No. PCT/US2013/061225, Jun. 4, 2014, 12 pages.
"International Search Report and Written Opinion", Application No. PCT/US2013/021784, Apr. 30, 2013, 9 pages.
"International Search Report and Written Opinion", Application No. PCT/US2013/021783, May 15, 2013, 9 pages.
"Light Guide Techniques using LED Lamps", Application Brief I-003, retrieved from <http://www.ciri.org.nz/downloads/Lightpipe%20design.pdf> on Jan. 12, 2012,Oct. 14, 2008, 22 pages.
"Non-Final Office Action", U.S. Appl. No. 13/440,165, Feb. 6, 2014, 12 pages.
"Non-Final Office Action", U.S. Appl. No. 13/355,836, Nov. 4, 2013, 15 pages.
"Non-Final Office Action", U.S. Appl. No. 13/355,914, Feb. 14, 2014, 10 pages.
"Non-Final Office Action", U.S. Appl. No. 13/355,914, Oct. 28, 2014, 18 pages.
"Non-Final Office Action", U.S. Appl. No. 13/397,539, Mar. 16, 2015, 9 pages.
"Non-Final Office Action", U.S. Appl. No. 13/428,879, Feb. 24, 2015, 10 pages.
"Non-Final Office Action", U.S. Appl. No. 13/428,879, Mar. 17, 2014, 10 pages.
"Non-Final Office Action", U.S. Appl. No. 13/432,311, Jul. 8, 2014, 33 pages.
"Non-Final Office Action", U.S. Appl. No. 13/432,372, May 9, 2014, 26 pages.
"Non-Final Office Action", U.S. Appl. No. 13/432,372, Oct. 24, 2014, 27 pages.
"Non-Final Office Action", U.S. Appl. No. 13/440,165, Feb. 13, 2015, 10 pages.
"Non-Final Office Action", U.S. Appl. No. 13/440,165, Oct. 16, 2014, 11 pages.
"Non-Final Office Action", U.S. Appl. No. 13/477,646, Oct. 6, 2014, 34 pages.
"Non-Final Office Action", U.S. Appl. No. 13/477,646, Nov. 22, 2013, 20 pages.
"Non-Final Office Action", U.S. Appl. No. 13/570,073, Jan. 23, 2015, 7 pages.
"Non-Final Office Action", U.S. Appl. No. 13/631,308, Feb. 23, 2015, 9 pages.
"Non-Final Office Action", U.S. Appl. No. 13/774,875, Nov. 24, 2014, 8 pages.
"Non-Final Office Action", U.S. Appl. No. 14/134,993, Jan. 22, 2015, 17 pages.
"Notice of Allowance", U.S. Appl. No. 13/355,836, Jun. 13, 2014, 11 pages.
"Notice of Allowance", U.S. Appl. No. 13/355,836, Oct. 8, 2014, 11 pages.
"Notice of Allowance", U.S. Appl. No. 13/488,145, Nov. 19, 2014, 8 pages.
"Restriction Requirement", U.S. Appl. No. 13/355,836, Sep. 27, 2013, 6 pages.
"Restriction Requirement", U.S. Appl. No. 13/488,145, Sep. 8, 2014, 14 pages.
"Restriction Requirement", U.S. Appl. No. 13/570,073, Nov. 18, 2014, 7 pages.
"Two-Faced: Transparent Phone with Dual Touch Screens", Retrieved from <http://gajitz.com/two-faced-transparent-phone-with-dual-touch-screens/>, Jun. 7, 2012, 3 pages.
"Written Opinion", Application No. PCT/US2013/061225, Oct. 10, 2014, 6 Pages.
Aron, "'Sprinting' chips could push phones to the speed limit", New Scientist, Feb. 20, 2012, Issue #2852, Feb. 20, 2012, 2 pages.
Barger, "COTS Cooling", Publication of the National Electronics Manufacturing Center of Excellence, Retrieved from: <http://www.empf.org/empfasis/2009/Oct09/cots.html > on Jul. 9, 12,Oct. 2009, 4 pages.
Baudisch, et al.,' "Back-of-Device Interaction Allows Creating Very Small Touch Devices", In Proceedings of 27th International Conference on Human Factors in Computing Systems, Retrieved from <http://citeseerx.ist.psu.edu/viewdoc/download?doi=10.1.1.160.3337&rep=rep1&type=pdf>,Apr. 2005, 10 pages.
Baxtor, "TwinTech GeForce GTS 250 XT OC 1GB Graphics Card", retrieved from <http://www.tweaktown.com/reviews/2733/twintech_geforce_gts_250_xt_oc_1gb_graphics_card/index3.html> on Dec. 30, 2011,Apr. 24, 2009, 4 pages.

(56) References Cited

OTHER PUBLICATIONS

Chen, et al.,' "Strategies for 3D Video with Wide Fields-of-View", IEEE Proceeding Optoelectronics, vol. 148, Issue 2, Available at <http://ieeexplore.ieee.org/stamp/stamp.jsp?tp=&arnumber=926823>,Apr. 2001, pp. 85-90.
Chirgwin, "Researchers propose 'overclock' scheme for mobiles—Processing at a sprint to overcome tech limitations", The Register, Feb. 21, 2012, 2 pages.
Coldewey, "Researchers Propose "Computational Sprinting" to Speed Up Chips by 1000%—But Only for a Second", TechCrunch, Feb. 28, 2012, Feb. 29, 2012, 2 pages.
Deagazio, "Selecting Display Backlighting for Portable, Handheld Devices", Hearst Electronics Products, retrieved from <http://www2.electronicproducts.com/Selecting_display_backlighting_for_portable_handheld_devices-article-farcglobal-feb2008-html.aspx> on Jan. 12, 2012,Jan. 2, 2008, 4 pages.
Eadicicco, "First Transparent Tablet Lets You Touch From Both Sides", Retrieved from <http://blog.laptopmag.com/first-transparent-tablet>, Dec. 26, 2013, 4 pages.
Greenemeier, "Could "Computational Sprinting" Speed Up Smart Phones without Burning Them Out?", Scientific American, Feb. 29, 2012, 2 pages.
Han, et al.,' "Accurate diffraction efficiency control for multiplexed volume holographic gratings", Retrieved at: opticalengineering.spiedigitallibrary.org/data/Journals/.../2799_1, 2002, 4 pages.
Hua, et al.,' "Engineering of Head-mounted Projective Displays", In Proceedings of Applied Optics, vol. 39, No. 22, Aug. 1, 2000, 11 pages.
Jarvenpaa, et al.,' "Compact near-to-eye display with integrated gaze tracker", Second International Conference on Computer Engineering and Applications, Mar. 19, 2010, 9 pages.
Jaworski, et al.,' "A Novel Design of Heat Sink with PCM for Electronics Cooling", 10th International Conference on Thermal Energy Storage, Stockton, May 31-Jun. 2, 2006, retrieved from <https://intraweb.stockton.edu/eyos/energy_studies/content/docs/FINAL_PRESENTATIONS/4b-6%20.pdf> on Jan. 5, 2012,May 31, 2006, 8 pages.
Kress, et al.,' "Exit Pupil for Wearable See-through displays", Downloaded From: http://proceedings.spiedigitallibrary.org/ on Jan. 31, 2015 Terms of Use: http://spiedl.org/terms, 2012, 8 pages.
Krishnan, et al.,' "A Novel Hybrid Heat Sink Using Phase Change Materials for Transient Thermal Management of Electronics", IEEE transactions on components and packaging technologies, vol. 28, No. 2, retrieved from <http://ieeexplore.ieee.org/stamp/stamp.jsp?tp=&arnumber=1432936> on Jan. 5, 2012,Jun. 2005, pp. 281-289.
Lanman, et al.,' "Near-eye Light Field Displays", In Journal of ACM Transactions on Graphics, vol. 32, No. 6, Nov. 2013, 10 pages.
Large, et al.,' "Parallel Optics in Waveguide Displays: a Flat Panel Autostereoscopic", Display Technology, Journal of, Retrieved from <http://download.microsoft.com/download/D/2/E/D2E425F8-CF3C-4C71-A4A2-70F9D4081007/ParallelOpticsinWaveguideDisplaysMS090925.Final.pdf>,Jun. 21, 2010, pp. 1-7.
Lerner, "Penn Helps Rethink Smartphone Design With 'Computational Sprinting'", Penn News Release, Feb. 28, 2012, 2 pages.
Li, et al.,' "Switchable Electro-optic Diffractive Lens with High Efficiency for Ophthalmic Applications", PNAS Apr. 18, 2006 vol. 103 No. 16 6100-6104, Retrieved from: <http://www.pnas.org/content/103/16/6100.long> Feb. 22, 2012,Feb. 2, 2006, 4 pages.
Man, et al.,' "IT Equipment Noise Emission Standards: Overview of New Development in the Next Edition of ISO/ECMA Standards", In Proceedings of 37th International Congress and Exposition on Noise Control Engineering, Available at <http://www.ecma-international.org/activities/Acoustics/Inter-noise%202008%20paper%20on%20ECMA-74%20updates.pdf >,Oct. 26, 2008, 8 pages.
Massenot, et al.,' "Multiplexed holographic transmission gratings recorded in holographic polymer-dispersed liquid crystals: static and dynamic studies", Retrieved at: http://oatao.univ-toulouse.fr/2874/, 2005, 8 pages.

McMillan, "Your Future iPhone May Be Stuffed With Wax", Aug. 23, 2013, 3 pages.
Minier, et al.,' "Diffraction Characteristics of Superimposed Holographic gratings in Planar Optical waveguides", IEEE Photonics Technology Letters, vol. 4, No. 10, Oct. 1992, 4 pages.
Moore, "Computational sprinting pushes smartphones till they're tired", Michigan News Release, Feb. 28, 2012, 2 pages.
Nguyen, et al.,' "Advanced Cooling System Using Miniature Heat Pipes in Mobile PC", IEEE Transactions on Components and Packaging Technology, vol. 23, No. 1, Available at <http://ieeexplore.ieee.org/stamp/stamp.jsp?tp=&arnumber=833046&userType=inst>,Mar. 2000, pp. 86-90.
Owano, "Study explores computing bursts for smartphones", PhysOrg.com, Feb. 21, 2012, 2 pages.
Papaefthymiou, et al.,' "Computational Sprinting on a Hardware/Software Testbed", In the Proceedings of the 18th Eighteenth International Conference on Architectural Support for Programming Languages and Operating Systems (ASPLOS), Mar. 2013., 12 pages.
Patrizio, "Researchers Working on Ways to Put 16-Core Processors in Smartphones", Brighthand, Mar. 18, 2012, 2 pages.
Pu, et al.,' "Exposure schedule for multiplexing holograms in photopolymer films", Retrieved at: lo.epfl.ch/webdav/site/lo/shared/1996/OE_35_2824_Oct1996.pdf, Oct. 1996, 6 pages.
Raghavan, et al.,' "Computational Sprinting", In the Proceedings of the 18th Symposium on High Performance Computer Architecture (HPCA), Feb. 2012, 12 pages.
Raghavan, et al.,' "Designing for Responsiveness With Computational Sprinting", IEEE Micro's "Top Picks of 2012" Issue, May 2013, 8 pages.
Scott, et al.,' "RearType: Text Entry Using Keys on the Back of a Device", In Proceedings of 12th Conference on Human-Computer Interaction with Mobile Devices and Services, Retrieved from <https://research.microsoft.com/pubs/135609/reartype%20mobilehci.pdf>,Sep. 7, 2010, 9 pages.
Stupar, et al.,' "Optimization of Phase Change Material Heat Sinks for Low Duty Cycle High Peak Load Power Supplies", IEEE transactions on components, packaging and manufacturing technology, retrieved from <http://ieeexplore.ieee.org/stamp/stamp.jsp?tp=&arnumber=6081913> on Jan. 5, 2012,Nov. 15, 2011, 14 pages.
Tari, et al.,' "CFD Analyses of a Notebook Computer Thermal Management System and a Proposed Passive Cooling Alternative", IEEE Transactions on Components and Packaging Technologies, vol. 33, No. 2, retrieved from <http://ieeexplore.ieee.org/stamp/stamp.jsp?tp=&arnumber=5466211> on Dec. 30, 2011,Jun. 2010, pp. 443-452.
Travis, et al.,' "Collimated Light from a Waveguide for a Display Backlight", Optics Express, Retrieved from <http://download.microsoft.com/download/D/2/E/D2E425F8-CF3C-4C71-A4A2-70F9D4081007/OpticsExpressbacklightpaper.pdf>,Oct. 15, 2009, pp. 19714-19719.
Travis, et al.,' "The Design of Backlights for View-Sequential 3D", Microsoft Corporation, Available at <http://download.microsoft.com/download/D/2/E/D2E425F8-CF3C-4C71-A4A2-70F9D4081007/Backlightforviewsequentialautostereo.docx>,Jul. 3, 2010, 4 pages.
Van "A Survey of Augmented Reality Technologies, Applications and Limitations", The International Journal of Virtual Reality, 2010, 9(2), Available at <http://www.ijvr.org/issues/issue2-2010/paper1%20.pdf>,Jun. 2010, pp. 1-19.
Walker, "Thermalright Ultra-120 Extreme CPU Cooler", retrieved from <http://www.pro-clockers.com/cooling/66-thermalright-ultra-120-extreme-cpu-cooler.html> on Dec. 30, 2011,Jul. 2, 2009, 7 pages.
Westerinen, et al.,' "Light Guide Display and Field of View", U.S. Appl. No. 13/428,879, filed Mar. 23, 2012, 46 pages.
Wigdor, et al.,' "LucidTouch: A See-Through Mobile Device", In Proceedings of 20th Annual ACM symposium on User Interface Software and Technology, Retrieved from <http://dl.acm.org/citation.cfm?id=1294259>,Oct. 7, 2007, 10 pages.
Yan, et al.,' "Multiplexing holograms in the photopolymer with equal diffraction efficiency", 2005, 9 pages.

(56) References Cited

OTHER PUBLICATIONS

Zharkova, et al.,' "Study of the Dynamics of Transmission Gratings Growth on Holographic Polymer-Dispersed Liquid Crystals", International Conference on Methods of Aerophysical Research, ICMAR 2008, 2008, 4 pages.

"Final Office Action", U.S. Appl. No. 13/336,873, Jan. 5, 2015, 21 pages.

"Final Office Action", U.S. Appl. No. 13/525,649, Oct. 9, 2014, 8 pages.

"Non-Final Office Action", U.S. Appl. No. 13/525,649, Jan. 29, 2014, 7 pages.

"Non-Final Office Action", U.S. Appl. No. 13/525,649, Jun. 5, 2014, 7 pages.

"Restriction Requirement", U.S. Appl. No. 13/397,539, Dec. 1, 2014, 6 pages.

Jacques, et al.,' "Polarized Light Imaging of Tissue", Available at <http://www.lumamed.com/documents/5_polarized%20light%20imaging.pdf>, 2004, 17 pages.

Li, et al.,' "Design Optimization of Reflective Polarizers for LCD Backlight Recycling", Journal of Display Technology, vol. 5, No. 8, Available at <http://ieeexplore.ieee.org/stamp/stamp.jsp?tp=&arnumber=5196840>, Aug. 2009, pp. 335-340.

Melcher, "LCoS for High Performance Displays", In Proceedings of LEOS 2003, Available at <http://ieeexplore.ieee.org/stamp/stamp.jsp?tp=&arnumber=1253048>, Oct. 27, 2003, pp. 812-813.

"Final Office Action", U.S. Appl. No. 13/722,917, Sep. 23, 2015, 14 pages.

"Non-Final Office Action", U.S. Appl. No. 13/397,516, Sep. 24, 2015, 14 pages.

"Corrected Notice of Allowance", U.S. Appl. No. 13/336,873, Sep. 11, 2015, 4 pages.

"Final Office Action", U.S. Appl. No. 13/440,165, Jul. 21, 2015, 11 pages.

"Final Office Action", U.S. Appl. No. 13/774,875, Jun. 4, 2015, 10 pages.

"Final Office Action", U.S. Appl. No. 14/134,993, Jul. 16, 2015, 19 pages.

"Foreign Office Action", CN Application No. 201210563730.3, Aug. 14, 2015, 4 Pages.

"Foreign Office Action", EP Application No. 13765041.2, Aug. 5, 2015, 6 pages.

"Foreign Office Action", EP Application No. 13769961.7, Jun. 30, 2015, 6 pages.

"Notice of Allowance", U.S. Appl. No. 13/336,873, Jul. 31, 2015, 6 pages.

"Restriction Requirement", U.S. Appl. No. 13/420,388, Aug. 13, 2015, 6 pages.

"Supplementary European Search Report", EP Application No. 13765041.2, Jul. 21, 2015, 3 pages.

"International Search Report and Written Opinion", Application No. PCT/US2012/069330, (Mar. 28, 2013), 9 pages.

"PCT Search Report and Written Opinion", Application No. PCT/US2012/069331, (Mar. 29, 2013), 10 pages.

"PCT Search Report and Written Opinion", Application No. PCT/US2012/071563, (Apr. 25, 2013), 13 pages.

"PCT Search Report and Written Opinion", Application No. PCT/US2013/026200, (Jun. 3, 2013), 9 pages.

"Final Office Action", U.S. Appl. No. 13/397,539, Jun. 29, 2015, 11 pages.

"Foreign Office Action", EP Application No. 13769961.7, Mar. 11, 2015, 8 pages.

"Non-Final Office Action", U.S. Appl. No. 13/336,873, Apr. 9, 2015, 18 pages.

"Non-Final Office Action", U.S. Appl. No. 13/397,617, May 5, 2015, 6 pages.

"Non-Final Office Action", U.S. Appl. No. 13/428,879, Jun. 26, 2015, 13 pages.

"Non-Final Office Action", U.S. Appl. No. 13/432,311, Jun. 2, 2015, 25 pages.

"Non-Final Office Action", U.S. Appl. No. 13/477,646, Jun. 18, 2015, 43 pages.

"Non-Final Office Action", U.S. Appl. No. 13/722,917, May 21, 2015, 12 pages.

"Supplementary European Search Report", EP Application No. 13769961.7, Mar. 3, 2015, 3 pages.

"Corrected Notice of Allowance", U.S. Appl. No. 13/336,873, Nov. 27, 2015, 4 pages.

"Final Office Action", U.S. Appl. No. 13/397,617, Nov. 18, 2015, 11 pages.

"Final Office Action", U.S. Appl. No. 13/477,646, Nov. 24, 2015, 39 pages.

"Foreign Notice of Allowance", CN Application No. 201210563730.3, Nov. 30, 2015, 4 Pages.

"International Search Report and Written Opinion", Application No. PCT/US2015/041900, Oct. 21, 2015, 12 pages.

"International Search Report and Written Opinion", Application No. PCT/US2015/041909, Oct. 20, 2015, 13 pages.

"Non-Final Office Action", U.S. Appl. No. 13/397,539, Oct. 1, 2015, 12 pages.

"Non-Final Office Action", U.S. Appl. No. 13/420,388, Dec. 4, 2015, 7 pages.

"Non-Final Office Action", U.S. Appl. No. 13/774,875, Sep. 16, 2015, 8 pages.

"Notice of Allowance", U.S. Appl. No. 14/134,993, Nov. 17, 2015, 9 pages.

Ando, "Development of Three-Dimensional Microstages Using Inclined Deep-Reactive Ion Etching", Journal of Microelectromechanical Systems, Jun. 1, 2007, 10 pages.

Gila, "First Results From a Multi-Ion Beam Lithography and Processing System At The University Of Florida", AIP Conference Proceedings, Jun. 1, 2011, 6 pages.

"Final Office Action", U.S. Appl. No. 13/428,879, Dec. 10, 2015, 16 pages.

"Final Office Action", U.S. Appl. No. 13/432,311, Dec. 18, 2015, 9 pages.

\* cited by examiner

LASER ILLUMINATION SCANNING

BACKGROUND

Virtual reality can be viewed as a computer-generated simulated environment in which a user has an apparent physical presence. A virtual reality experience can be generated in 3D and viewed with a head-mounted display (HMD), such as glasses or other wearable display device that has near-eye display panels as lenses to display a virtual reality environment, which replaces the actual environment. Augmented reality, however, provides that a user can still see through the display lenses of the glasses or other wearable display device to view the surrounding environment, yet also see images of virtual objects that are generated for display and appear as a part of the environment. Augmented reality can include any type of input such as audio and haptic inputs, as well as virtual images, graphics, and video that enhances or augments the environment that a user experiences. As an emerging technology, there are many challenges and design constraints with augmented reality, from generation of the virtual objects and images so that they appear realistic in a real environment, to developing the optics small and precise enough for implementation with a wearable display device. There are also challenges to developing illumination sources for implementation as micro projectors and/or imaging units for wearable display devices.

Conventional LCOS (liquid crystal on silicon) projection technologies use an LED (light emitting diode) or laser source to generate light that is reflected off of a silicon transistor array covered by an LCD (liquid crystal display) material to either reflect and/or change the polarization of the light. The LCOS reflective technology uses liquid crystals instead of individual micro-mirror array MEMS (micro-electro-mechanical systems) mirrors. The liquid crystals are applied to a reflective mirror substrate and, as the liquid crystals open and close, the light is either reflected from the mirror below or blocked to modulate the emitted light. LCOS-based projectors typically use three LCOS chips, one each to modulate the red, green, and blue (RGB) components of the light. Similar to an LCD projector which uses three LCD panels, both LCOS and LCD projectors simultaneously project the red, green, and blue components of the light, such as for display on a display screen. A conventional display technology utilizes OLEDs (organic light emitting diodes) that generate light when current is applied through layers of the organic material. Although OLED cells can be individually controlled for illumination, unlike the LCOS material, the OLEDs are not viable for projection illumination because they do not emit enough light.

Some conventional LED array scanning systems for display technologies that have large optical systems are typically too large and complex to be implemented in imaging units for wearable display devices. Limitations of the current technology include the ability to modulate the emitters in sequence in a scanning system, which can result in a slow refresh rate, a blurred image quality, and/or limited color depth. Another limitation of conventional LED array scanning systems is the relatively larger pitch between the LED emitters, which results in a larger optical system with size and weight barriers to implementation in a consumer HMD product. The light that is emitted for LED array scanning is moved across a surface, such as via a MEMS mirror, LC scanner, or by moving optics. However, the light efficiency of each emitter can vary based on production and material variances, bonding issues, connectivity issues, driver variance, micro-optics, color conversion variance, temperature, and/or optic differences across the surface.

SUMMARY

This Summary introduces simplified concepts of laser illumination scanning, and the concepts are further described below in the Detailed Description and/or shown in the Figures. This Summary should not be considered to describe essential features of the claimed subject matter, nor used to determine or limit the scope of the claimed subject matter.

Laser illumination scanning is described. In embodiments, an imaging unit includes a linear array of spatial light modulators that direct light in a direction perpendicular to an imaging scan direction. The lasers each emit the light through a diffractive optic that uniformly illuminates the spatial light modulators, and a scanning mirror then scans the spatial light modulators to generate a two-dimensional image for display.

In other embodiments, the lasers include red, green, and blue lasers for red, green, and blue (RGB) illumination of the spatial light modulators. The spatial light modulators can be implemented as reflective liquid crystal on silicon (LCOS), transmissive LCOS, or as micro-electro-mechanical systems (MEMS) mirrors. Other implementations of the spatial light modulators are described below. The scanning mirror is a single axis mirror configured to scan the linear array of the spatial light modulators in one dimension to generate the two-dimensional image for display. A field of view in the imaging scan direction corresponds to a range of motion of the scanning mirror. Further, the field of view in the direction perpendicular to the imaging scan direction corresponds to a length of the linear array of the spatial light modulators and a focal length of projection optics of the imaging unit.

BRIEF DESCRIPTION OF THE DRAWINGS

Embodiments of laser illumination scanning are described with reference to the following Figures. The same numbers may be used throughout to reference like features and components that are shown in the Figures.

DETAILED DESCRIPTION

Embodiments of laser illumination scanning are described. An imaging system of a wearable display device (e.g., glasses or a head-mounted display) can include left and right imaging units that generate a virtual image for display and viewing. In a scanning system, lasers can be implemented to illuminate a linear array of spatial light modulators that are scanned to generate a two-dimensional image for display or projection. For example, red, green, and blue (RGB) lasers emit RGB light that illuminates the linear array of spatial light modulators, which is then reflected through optics onto a scanning mirror and directed into a waveguide or otherwise projected.

The lasers and linear array of spatial light modulators provides a reduction in size over a conventional linear array, as well as a corresponding reduction in the size of the optics that can be implemented for a wearable display device.

While features and concepts of laser illumination scanning can be implemented in any number of different devices, systems, environments, and/or configurations, embodiments of laser illumination scanning are described in the context of the following example devices, systems, and methods.

Figure 1:
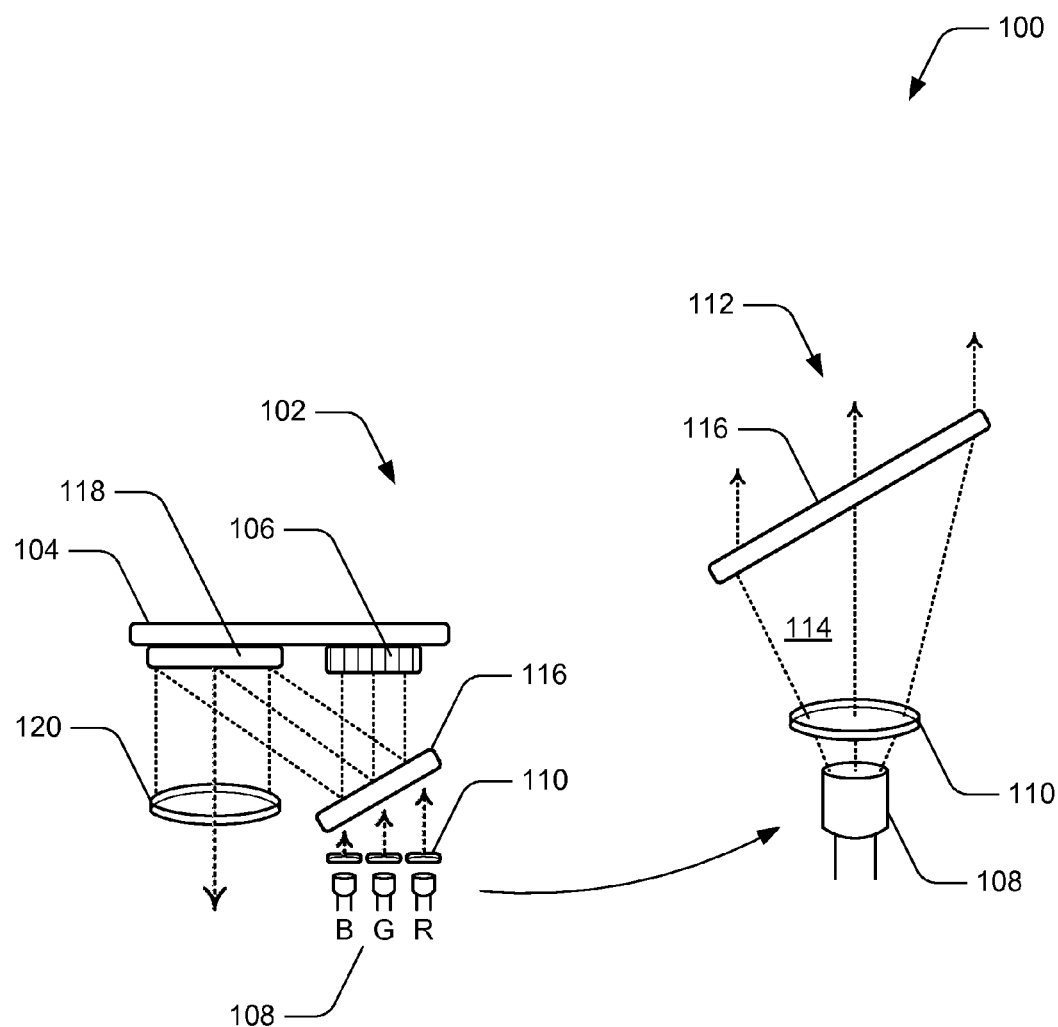
FIG. 1 illustrates an example system in which embodiments of laser illumination scanning can be implemented.

FIG. 1 illustrates an example 100 of an imaging unit 102 in an embodiment of laser illumination scanning. The imaging unit 102 includes a printed circuit board 104 that incorporates a linear array of spatial light modulators 106. The spatial light modulators direct light in a direction perpendicular to an imaging scan direction of a scanning system, such as implemented for a projection system or wearable display device. An imaging system of a wearable display device (e.g., glasses or a head-mounted display) can include left and right imaging units that generate a virtual image for display and viewing. In embodiments, the imaging unit 102 is implemented with lasers 108 that each emit the light through a diffractive optic 110 to uniformly illuminate the array of spatial light modulators 106. The diffractive optics 110 create a structured light pattern to uniformly illuminate the linear array of spatial light modulators. For example, as shown at 112, a laser 108 emits the light 114 through the diffractive optic 110 and through a polarizing beam-splitter (PBS) panel 116 (also commonly referred to as a 50/50 mirror) to illuminate the array of spatial light modulators.

In the example imaging unit 102, the lasers 108 can include a red laser, a green laser, and a blue laser that are independently controlled for red, green, and blue (RGB) illumination of the spatial light modulators. The array of spatial light modulators 106 can be implemented as reflective liquid crystal on silicon (LCOS), transmissive LCOS, or as micro-electro-mechanical systems (MEMS) mirrors. The spatial light modulators may also be implemented with a non-silicon backplane, such as LTPS (low temperature polysilicon) or oxide TFTs displays. Alternatively, the spatial light modulators may use an acousto-optical modulator (AOM) instead of a mirror, or a surface acoustic wave deflector. Alternatively, the spatial light modulators can be implemented with integrated optics, such as with a CMOS chip that uses a silicon-oxide wave-guide structure to split the laser light into 500-1000 individual guides that are each electrically controllable. Another implementation option for the spatial light modulators is a linear, high-resolution MEMS structure that is used as an echelon grating, and provides that the light from dark pixels is not wasted, but rather is redistributed to bright pixels for a better light efficiency.

When the spatial light modulators 106 are illuminated, the spatial light modulators then adjust the light output in the direction perpendicular to the scan direction, and the polarizing beam-splitter panel 116 reflects the light onto a MEMS scanning mirror 118 (e.g., or other electrically alterable mirror) that is also incorporated with the printed circuit board 104 for line scanning techniques. The scanning mirror 118 can be implemented as a single axis mirror to scan the linear array of spatial light modulators 106 to generate a two-dimensional image for display.

The imaged light is then directed by the scanning mirror 118 through an imaging optic 120 that directs the light for projection or wearable display device implementations. A field of view in the imaging scan direction corresponds to a range of motion of the scanning mirror, and the resolution in the scanning direction is determined by the modulation of the spatial light modulators 106 during the scanning motion.

Further, the field of view in the direction perpendicular to the imaging scan direction corresponds to a length of the linear array of the spatial light modulators 106 and a focal length of projection optics of the imaging unit. The resolution is determined by the pitch of the elements. In implementations, the scanner can be monochrome, color, and may also include infra-red (IR) illumination.

In implementations, the laser emissions may have a long coherence length, in which case the diffractive optics 110 can be mounted on an piezo actuator that vibrates a diffractive optic a small amount in the plane perpendicular to the optical axis. Further, the lasers 108 in the imaging unit 102 have an overall smaller etendue (i.e., dispersion of the emitted light) than conventional LEDs. The smaller etendue in combination with the smaller elements that are utilized to implement the linear array of spatial light modulators results in a much improved optical-to-optical efficiency of the scanning engine. The lasers and linear array of spatial light modulators also provide a reduction in size over a conventional linear array, as well as a corresponding reduction in the size of the optics and wearable display device.

Figure 2:
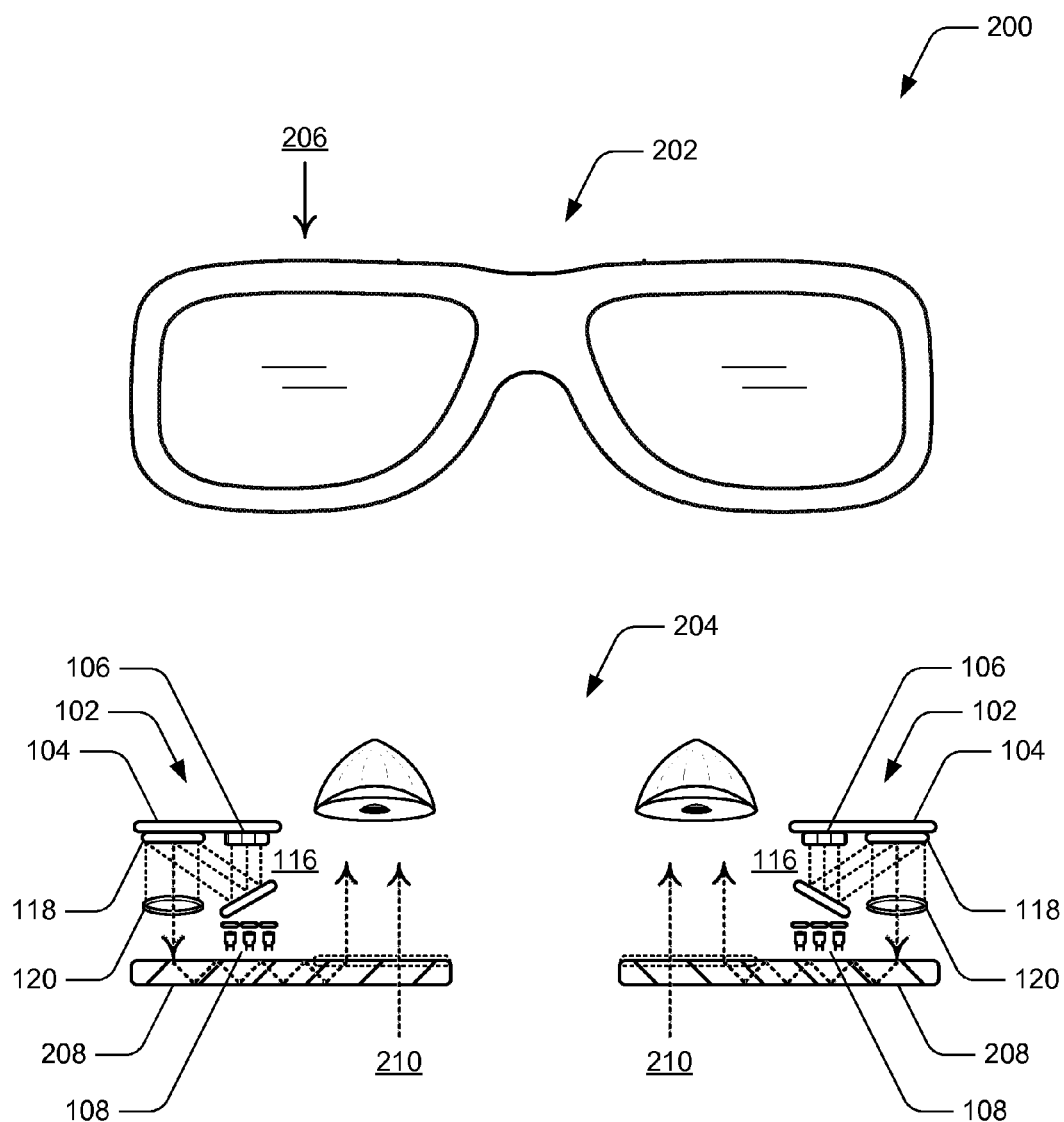
FIG. 2 illustrates an example system in which embodiments of laser illumination scanning can be implemented.

FIG. 2 illustrates an example system 200 in which various embodiments of laser illumination scanning can be implemented. An example wearable display device 202 includes left and right display lens systems, such as display lens systems 204 that are viewed from a perspective 206 of the wearable display device, as if viewing the display lens systems from the top of the device. In embodiments, the display lens systems 204 can be implemented as left and right display lens systems of the wearable display device described with reference to FIG. 3. A wearable display device can be implemented as any type of glasses or head-mounted display (HMD) that includes implementations of the display lens systems 204 (e.g., left and right display lens systems) through which a user can view the surrounding environment, yet also see virtual images that are generated for display and appear as a part of the environment. References to a left imaging system and a right imaging system, as described herein, correlate to a user's left and right eyes (e.g., from the perspective of wearing and looking through the wearable display device). Alternatively, the left and right imaging systems may be described from the perspective of looking at the wearable display device.

The display lens systems 204 include a display optic 208, such as a see-through and reflecting waveguide, through which light 210 of an image (e.g., an image of the environment as viewed through the wearable display device) is projected for viewing. In this example, the display lens systems 204 each include an implementation of the imaging unit 102 described with reference to FIG. 1. Additionally, an imaging unit can be implemented with any number of micro display panels, imaging structures with direct emitters, laser emitters, lenses, and reflecting elements to display and project a virtual image into a see-through and reflecting waveguide. The see-through, reflecting waveguide (i.e., the display optic 208) is implemented for internal reflection and conducts visible light of a virtual image that is generated by the imaging units 102 for viewing by a user, and also passes through the light 210 from the surrounding environment for viewing by the user. A display lens system 204 with an imaging unit can also be implemented with components of the display lens system described with reference to FIG. 3 to implement embodiments of laser illumination scanning.

In embodiments, the imaging units 102 of the display lens systems 204 each include the printed circuit board 104 that incorporates a linear array of spatial light modulators 106 that direct the light in the direction perpendicular to an imaging scan direction of a scanning system. The imaging units 102 are implemented with the lasers 108 that emit the RGB light through the diffractive optics 110 and the polarizing beam-splitter (PBS) panel 116 to uniformly illuminate the array of spatial light modulators. The polarizing beam-splitter panel 116 reflects the light onto a MEMS scanning mirror 118 that is incorporated with the printed circuit board 104 to generate a two-dimensional image for display. The imaged light is then directed by the scanning mirror 118 through the imaging optic 120 that directs the light into the see-through, reflecting waveguide (i.e., the display optic 208).

Figure 3:
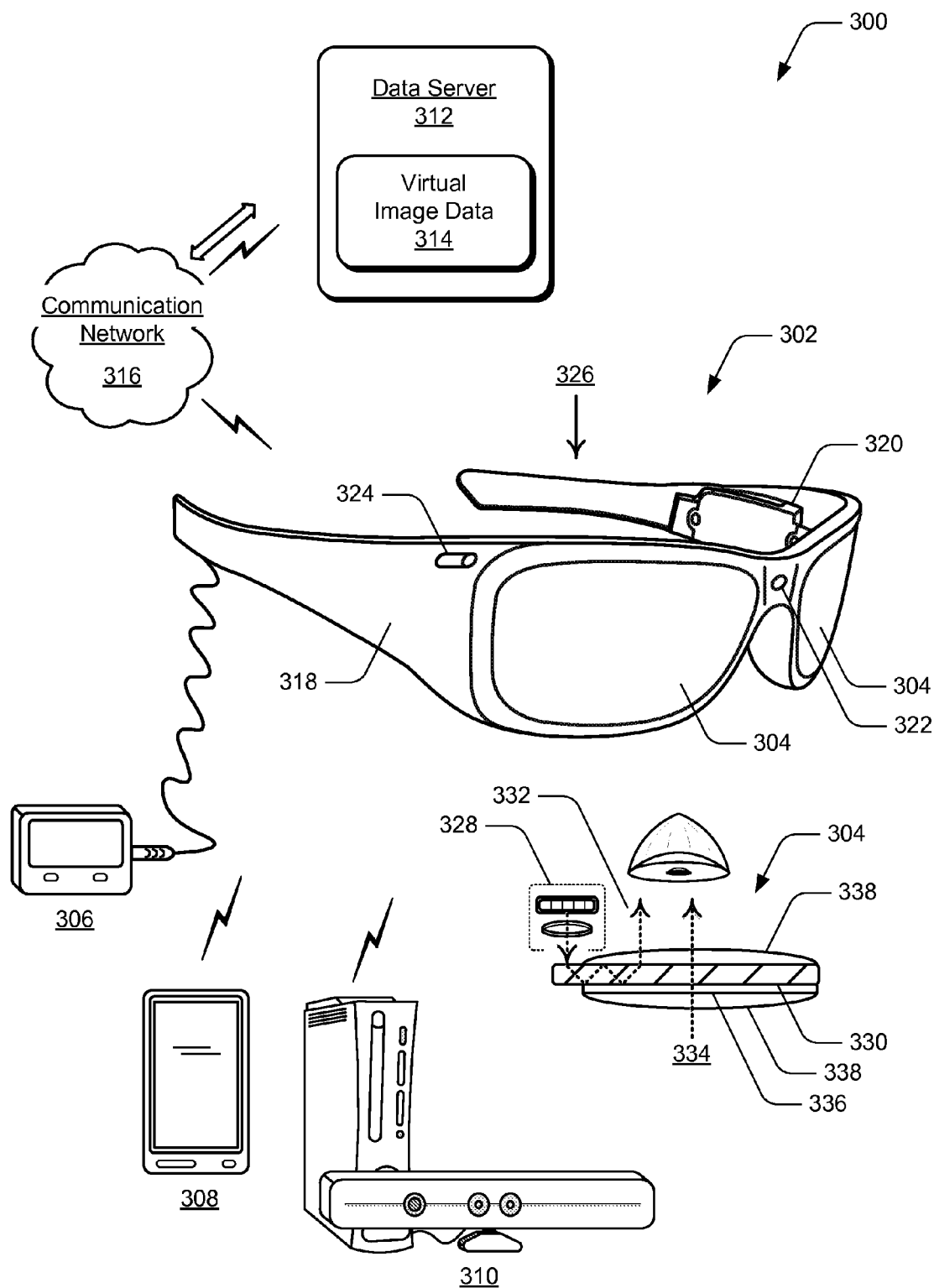
FIG. 3 illustrates an example system that includes an example of a wearable display device in which embodiments of laser illumination scanning can be implemented.

FIG. 3 illustrates an example system 300 that includes an example wearable display device 302 in which embodiments of laser illumination scanning can be implemented. The wearable display device can be implemented as any type of glasses or head-mounted display (HMD) that includes display lens systems 304 (e.g., left and right display lens systems) through which a user can view the surrounding environment, yet also see virtual images (e.g., any type of object, video, text, graphic, and the like) that are generated for display and appear as a part of the environment.

The wearable display device 302 can be implemented as an independent, portable system that includes memory, software, a processor, and/or a power source. Alternatively or in addition, the wearable display device may be communicatively linked to a controller 306 that includes any one or combination of the memory, software, processor, and/or power source, such as a battery unit. The controller can be implemented for wired or wireless communication with the wearable display device. The controller and/or the wearable display device can also be implemented with any number and combination of differing components as further described with reference to the example device shown in FIG. 5. For example, the controller and/or the wearable display device includes an imaging application implemented as computer-executable instructions, such as a software application, and executed by a processor to implement embodiments of laser illumination scanning as described herein.

In embodiments, the controller may be implemented as a dedicated device (e.g., the wired controller 306), as a mobile phone 308, a tablet or other portable computer device, a gaming system 310, or as any other type of electronic device that can be implemented to process and generate virtual images for display as part of the environment that is viewed through the display lens system of the wearable display device. The controller may communicate with the wearable display device wirelessly via WiFi™, Bluetooth™, infrared (IR), RFID transmission, wireless Universal Serial Bus (WUSB), cellular, or via other wireless communication techniques.

The example system 300 also includes a data server 312, or data service, that communicates, or otherwise distributes, virtual image data 314 to the wearable display device 302 via a communication network 316. For example, the data server may be part of a network-based gaming system that generates virtual images for augmented reality display at the wearable display device. Alternatively, the data server may be part of a navigation system that communicates navigation directions and information for display in the display lens systems 304 of the wearable display device. In another example, the data server may be part of a messaging service, such as an e-mail or text messaging system, that communicates e-mail and/or text messages to the wearable display device for display in the display lens systems, where a user can read a message as an augmented reality image that is displayed over the environment viewed through the wearable display device.

Any of the devices, servers, and/or services can communicate via the communication network 316, which may be implemented to include wired and/or wireless networks. The communication network can also be implemented using any type of network topology and/or communication protocol, and can be represented or otherwise implemented as a combination of two or more networks, to include IP-based networks and/or the Internet. The communication network may also include mobile operator networks that are managed by mobile operators, such as a communication service provider, cell-phone provider, and/or Internet service provider.

The wearable display device 302 includes a frame 318, such as in the form of glasses, goggles, or any other structure, that supports and incorporates the various components of the device, as well as serves as a conduit for electrical and other component connections. A components module 320 (or components modules on the left, right, and/or both sides of the device frame) incorporates any of the various components, such as processing and control circuitry, memory, software, a processor, GPS transceiver, and/or power source. The wearable display device may also include a microphone 322 to record audio data from the surrounding environment, as well as ear phones for audio feedback as part of an augmented reality experience.

The wearable display device 302 also includes various cameras 324 that capture video and still images of the surrounding environment. The image and video data can be processed on the device and/or by a controller device (e.g., controller 306), and used to create a mapping field to orient and track a user in the environment space. The wearable display device can also include eye tracking cameras used to determine a user's eyeball location and track eye movements. The wearable display device may also include a temperature sensor, as well as inertial sensors and/or attitude sensors, including MEMS gyros, magnetic sensors (e.g., a compass), and acceleration sensors for sensing position, orientation, and acceleration of the wearable display device.

An example of one display lens system 304 is shown from a viewer perspective 326 of the wearable display device 302, as if viewing the display lens system from the top of the device. The display lens system includes an imaging system 328, which can be implemented with any number of micro display panels, lenses, and reflecting elements to display and project a virtual image into a see-through and reflecting waveguide 330. A display lens system 304 can also be implemented as the imaging units described with reference to FIGS. 1 and 2 to implement embodiments of laser illumination scanning. The see-through, reflecting waveguide 330 is implemented for internal reflection and conducts the visible light 332 of a virtual image that is generated by the imaging unit for viewing by a user, and also passes through the light 334 from the surrounding environment for viewing by the user.

The micro display panels, lenses, and/or reflecting elements of the imaging system 328 can be implemented with various display technologies, such as implemented with a transparent LCD, or using a transmissive projection technology where the light source is modulated by optically active material, backlit with white light. These technologies can be implemented using LCD type displays with powerful backlights and high optical energy densities. Alternatively, a micro display and/or reflecting element can be implemented using a reflective technology, such as digital light processing (DLP) and liquid crystal on silicon (LCOS), that reflects external light, which is reflected and modulated by an optical material.

In embodiments, the imaging system 328 (or other components of a display lens system 304) can be implemented to include an infra-red (IR) laser utilized for system calibrations and/or as an illumination source for an eye-tracking system and camera that tracks the position of a user's eyes. The eye-tracking system includes the eye-tracking illumination source, which is not a visible light, and includes an eye-tracking IR sensor. In implementations that include color conversion, the illumination source can be implemented as UV or blue iLED arrays that emit the IR light, which may be emitted from one or more of the pixels. The IR sensor can be implemented as an IR camera that provides infrared image data of the eye for eye-tracking processing, or an IR sensor that detects eye reflections when the eye is illuminated. Alternatively or in addition, sensors can be implemented in the CMOS driver array to detect the feedback. In implementations, the light reflections (e.g., the IR return) may be directed with SBG or SRB methods. The see-through and reflecting waveguide 330 can also be utilized for the infrared illumination, and for eyeball reflections that the eye-tracking system uses to track the position of the user's eyes.

In this example, the display lens systems 304 include an optional opacity filter 336, and a see-through lens 338 on each side of the waveguide 330. The see-through lenses can be standard eye-glass lenses and made to prescription (or no prescription). The opacity filter selectively blocks natural light, either uniformly or on a per-pixel basis, from passing through the see-through and reflecting waveguide to enhance the contrast of a displayed virtual image.

Example method 400 is described with reference to FIG. 4 in accordance with one or more embodiments of laser illumination scanning. Generally, any of the services, functions, methods, procedures, components, and modules described herein can be implemented using software, firmware, hardware (e.g., fixed logic circuitry), manual processing, or any combination thereof. A software implementation represents program code that performs specified tasks when executed by a computer processor. The example methods may be described in the general context of computer-executable instructions, which can include software, applications, routines, programs, objects, components, data structures, procedures, modules, functions, and the like. The program code can be stored in one or more computer-readable storage media devices, both local and/or remote to a computer processor. The methods may also be practiced in a distributed computing environment by multiple computer devices. Further, the features described herein are platform-independent and can be implemented on a variety of computing platforms having a variety of processors.

Figure 4:
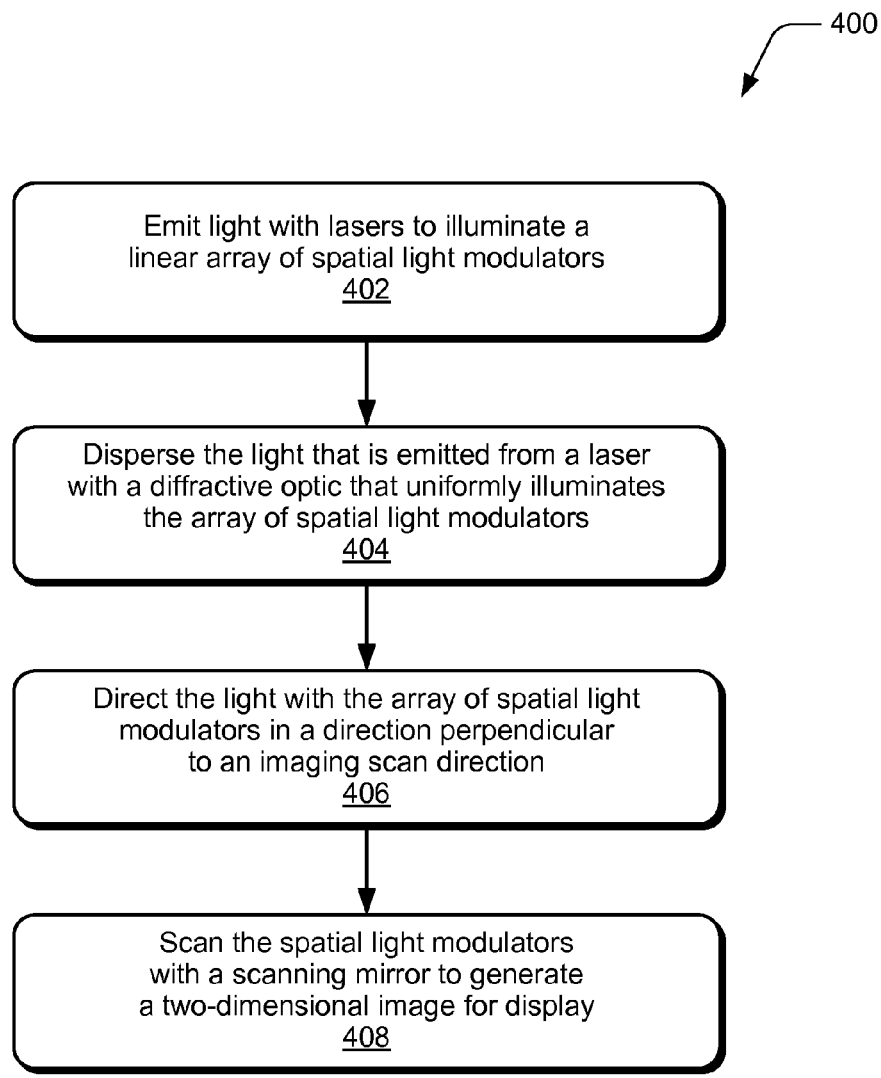
FIG. 4 illustrates example method(s) of laser illumination scanning in accordance with one or more embodiments.

FIG. 4 illustrates example method(s) 400 of laser illumination scanning. The order in which the method blocks are described are not intended to be construed as a limitation, and any number of the described method blocks can be combined in any order to implement a method, or an alternate method.

At block 402, light is emitted with lasers to illuminate a linear array of spatial light modulators. For example, the imaging unit 102 is implemented with the lasers 108 that emit the light through a diffractive optic 110 to uniformly illuminate the array of spatial light modulators 106. The lasers can include red, green, and blue lasers for RGB illumination of the spatial light modulators.

At block 404, the light that is emitted from a laser is dispersed with a diffractive optic that uniformly illuminates the array of spatial light modulators. For example, the diffractive optics 110 disperse the light that is emitted from the lasers 108 to create a structured light pattern that uniformly illuminates the linear array of spatial light modulators 106.

At block 406, the light is directed with the array of spatial light modulators in a direction perpendicular to an imaging scan direction. For example, the spatial light modulators 106 are implemented as reflective liquid crystal on silicon (LCOS), transmissive LCOS, or as MEMS mirrors that direct the light (e.g., the illumination emitted from the lasers 108) in the direction perpendicular to an imaging scan direction, such as directed to the polarizing beam-splitter panel 116.

At block 408, the spatial light modulators are scanned with a scanning mirror to generate a two-dimensional image for display. For example, the scanning mirror 118 of the imaging unit 102 scans (or sweeps) the spatial light modulators 106 to generate a two-dimensional image for display. In embodiments, the scanning mirror 118 is a single axis mirror that scans the linear array of the spatial light modulators in one dimension to generate the two-dimensional image for display. A field of view in the imaging scan direction corresponds to a range of motion of the scanning mirror. Further, a field of view in the direction perpendicular to the imaging scan direction corresponds to a length of the linear array of the spatial light modulators and a focal length of projection optics of the imaging unit.

Figure 5:
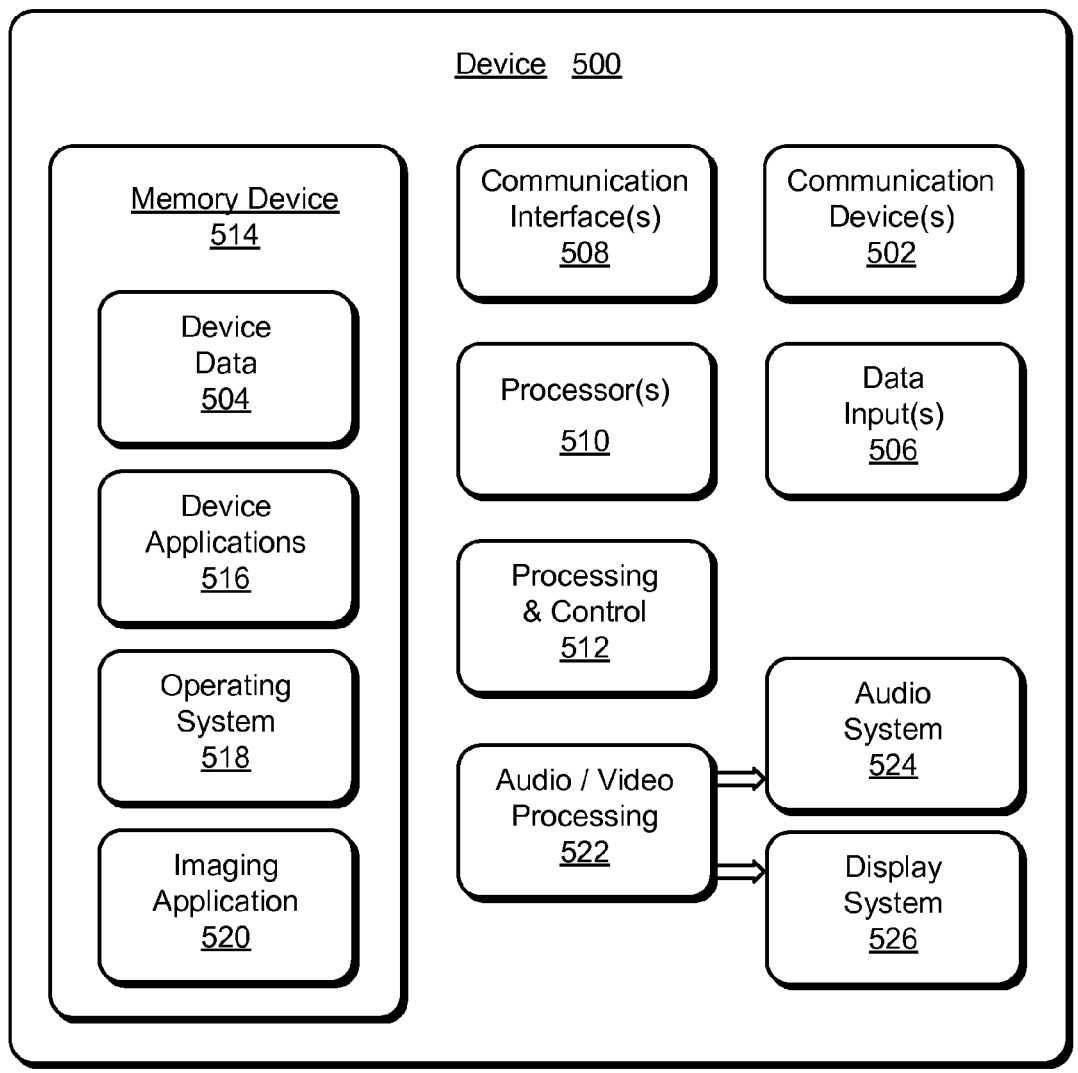
FIG. 5 illustrates various components of an example device that can implement embodiments of laser illumination scanning.

FIG. 5 illustrates various components of an example device 500 that can be implemented as any of the devices described with reference to the previous FIGS. 1-4, such as a wearable display device and/or a controller for a wearable display device. In embodiments, the device may be implemented as any one or combination of a fixed or mobile device, in any form of a consumer, computer, portable, communication, phone, navigation, appliance, gaming, media playback, and/or electronic device. The device may also be associated with a user (i.e., a person) and/or an entity that operates the device such that a device describes logical devices that include users, software, firmware, hardware, and/or a combination of devices.

The device 500 includes communication devices 502 that enable wired and/or wireless communication of device data 504, such as virtual image data, as well as video and images data, and other media content stored on the device. The media content stored on the device can include any type of audio, video, and/or image data. The device includes one or more data inputs 506 via which any type of data, media content, and/or inputs can be received, such as user-selectable inputs and any other type of audio, video, and/or image data received from any content and/or data source.

The device 500 also includes communication interfaces 508, such as any one or more of a serial, parallel, network, or wireless interface. The communication interfaces provide a connection and/or communication links between the device and a communication network by which other electronic, computing, and communication devices communicate data with the device.

The device 500 includes one or more processors 510 (e.g., any of microprocessors, controllers, and the like) or a processor and memory system (e.g., implemented in an SoC), which process computer-executable instructions to control the operation of the device. Alternatively or in addition, the device can be implemented with any one or combination of software, hardware, firmware, or fixed logic circuitry that is implemented in connection with processing and control circuits which are generally identified at 512. Although not shown, the device can include a system bus or data transfer system that couples the various components within the device. A system bus can include any one or combination of different bus structures, such as a memory bus or memory controller, a peripheral bus, a universal serial bus, and/or a processor or local bus that utilizes any of a variety of bus architectures.

The device 500 also includes one or more memory devices 514 (e.g., computer-readable storage media) that enable data storage, such as random access memory (RAM), non-volatile memory (e.g., read-only memory (ROM), flash memory, etc.), and a disk storage device. A disk storage device may be implemented as any type of magnetic or optical storage device, such as a hard disk drive, a recordable and/or rewriteable disc, and the like. The device may also include a mass storage media device. Computer-readable storage media can be any available medium or media that is accessed by a computing device.

A memory device 514 provides data storage mechanisms to store the device data 504, other types of information and/or data, and device applications 516. For example, an operating system 518 can be maintained as a software application with the memory device and executed on the processors. The device applications may also include a device manager or controller, such as any form of a control application, software application, signal processing and control module, code that is native to a particular device, a hardware abstraction layer for a particular device, and so on. In this example, the device applications also include an imaging application 520 that may implement embodiments of laser illumination scanning as described herein.

The device 500 may also include an audio and/or video processing system 522 that generates audio data for an audio system 524 and/or generates display data for a display system 526. In implementations, the audio system and/or the display system are external components to the device. Alternatively, the audio system and/or the display system are integrated components of the example device.

Although embodiments of laser illumination scanning have been described in language specific to features and/or methods, the appended claims are not necessarily limited to the specific features or methods described. Rather, the specific features and methods are disclosed as example implementations of laser illumination scanning.

The invention claimed is:

1. An imaging unit, comprising:
a linear array of spatial light modulators configured to direct light in a direction perpendicular to an imaging scan direction;
lasers configured to emit the light through a diffractive optic, creating a structured light pattern that uniformly illuminates the spatial light modulators;
a scanning mirror configured to scan the light reflected by the spatial light modulators to generate a two-dimensional image for display; and
a polarizing beam-splitter positioned between the diffractive optic, the linear array of spatial light modulators, and the scanning mirror, the polarizing beam-splitter configured to reflect the structured light pattern from the diffractive optic to the linear array of spatial light modulators and to the scanning mirror.

2. An imaging unit as recited in claim 1, wherein the lasers include a red laser, a green laser, and a blue laser for red, green, and blue (RGB) illumination of the spatial light modulators.

3. An imaging unit as recited in claim 1, wherein the spatial light modulators comprise one of reflective liquid crystal on silicon (LCOS) or transmissive LCOS.

4. An imaging unit as recited in claim 1, wherein the spatial light modulators comprise micro-electro-mechanical systems (MEMS) mirrors.

5. An imaging unit as recited in claim 1, wherein the scanning mirror is a single axis mirror configured to scan the linear array of the spatial light modulators in one dimension to generate the two-dimensional image for display.

6. An imaging unit as recited in claim 1, wherein a field of view in the imaging scan direction corresponds to a range of motion of the scanning mirror.

7. An imaging unit as recited in claim 1, wherein a field of view in the direction perpendicular to the imaging scan direction corresponds to a length of the linear array of the spatial light modulators and a focal length of projection optics of the imaging unit.

8. A method, comprising:
emitting light with lasers that illuminate an array of spatial light modulators;
dispersing the light that is emitted from a laser with a diffractive optic, creating a structured light pattern that uniformly illuminates the spatial light modulators;
reflecting the structured light pattern from the diffractive optic to a scanning mirror and to the array of spatial light modulators;
directing the light from the array of spatial light modulators in a direction perpendicular to an imaging scan direction; and
scanning the light reflected by the spatial light modulators with the scanning mirror to generate a two dimensional image for display.

9. A method as recited in claim 8, wherein the lasers include a red laser, a green laser, and a blue laser for red, green, and blue (RGB) illumination of the spatial light modulators.

10. A method as recited in claim 8, wherein the spatial light modulators comprise one of reflective liquid crystal on silicon (LCOS) or transmissive LCOS.

11. A method as recited in claim 8, wherein the spatial light modulators comprise micro-electro-mechanical systems (MEMS) mirrors.

12. A method as recited in claim 8, wherein the scanning mirror is a single axis mirror that scans the linear array of the spatial light modulators in one dimension to generate the two-dimensional image for display.

13. A method as recited in claim 8, wherein a field of view in the imaging scan direction corresponds to a range of motion of the scanning mirror.

14. A method as recited in claim 8, wherein a field of view in the direction perpendicular to the imaging scan direction corresponds to a length of the linear array of the spatial light modulators and a focal length of projection optics of the imaging unit.

15. A wearable display device, comprising:
left and right display lens systems configured for augmented reality imaging;
an eye-tracking system configured to track user eye position;
left and right imaging units of the respective left and right display lens systems configured to generate an augmented reality image, the left and right imaging units each comprising:
a linear array of spatial light modulators configured to direct light in a direction perpendicular to an imaging scan direction;
lasers configured to emit the light through a diffractive optic, creating a structured light pattern that uniformly illuminates the spatial light modulators and the emitted light configured as an illumination source for the eye-tracking system;
a scanning mirror configured to scan the light reflected by the spatial light modulators to generate a two-dimensional image for display; and a polarizing beam-splitter positioned between the diffractive optic, the linear array of spatial light modulators, and the scanning mirror, the polarizing beam-splitter configured to reflect the structured light pattern from the diffractive optic to the linear array of spatial light modulators and to the scanning mirror.

16. A wearable display device as recited in claim 15, wherein the lasers include a red laser, a green laser, and a blue laser for red, green, and blue (RGB) illumination of the spatial light modulators.

17. A wearable display device as recited in claim 15, wherein the spatial light modulators comprise one of reflective liquid crystal on silicon (LCOS) or transmissive LCOS.

18. A wearable display device as recited in claim 15, wherein the spatial light modulators comprise micro-electro-mechanical systems (MEMS) mirrors.

19. A wearable display device as recited in claim 15, wherein the scanning mirror is a single axis mirror configured to scan the linear array of the spatial light modulators in one dimension to generate the two-dimensional image for display.

20. A wearable display device as recited in claim 15, wherein:
   a field of view in the imaging scan direction corresponds to a range of motion of the scanning mirror; and
   the field of view in the direction perpendicular to the imaging scan direction corresponds to a length of the linear array of the spatial light modulators and a focal length of projection optics of the imaging unit.

* * * * *